Figure 1:
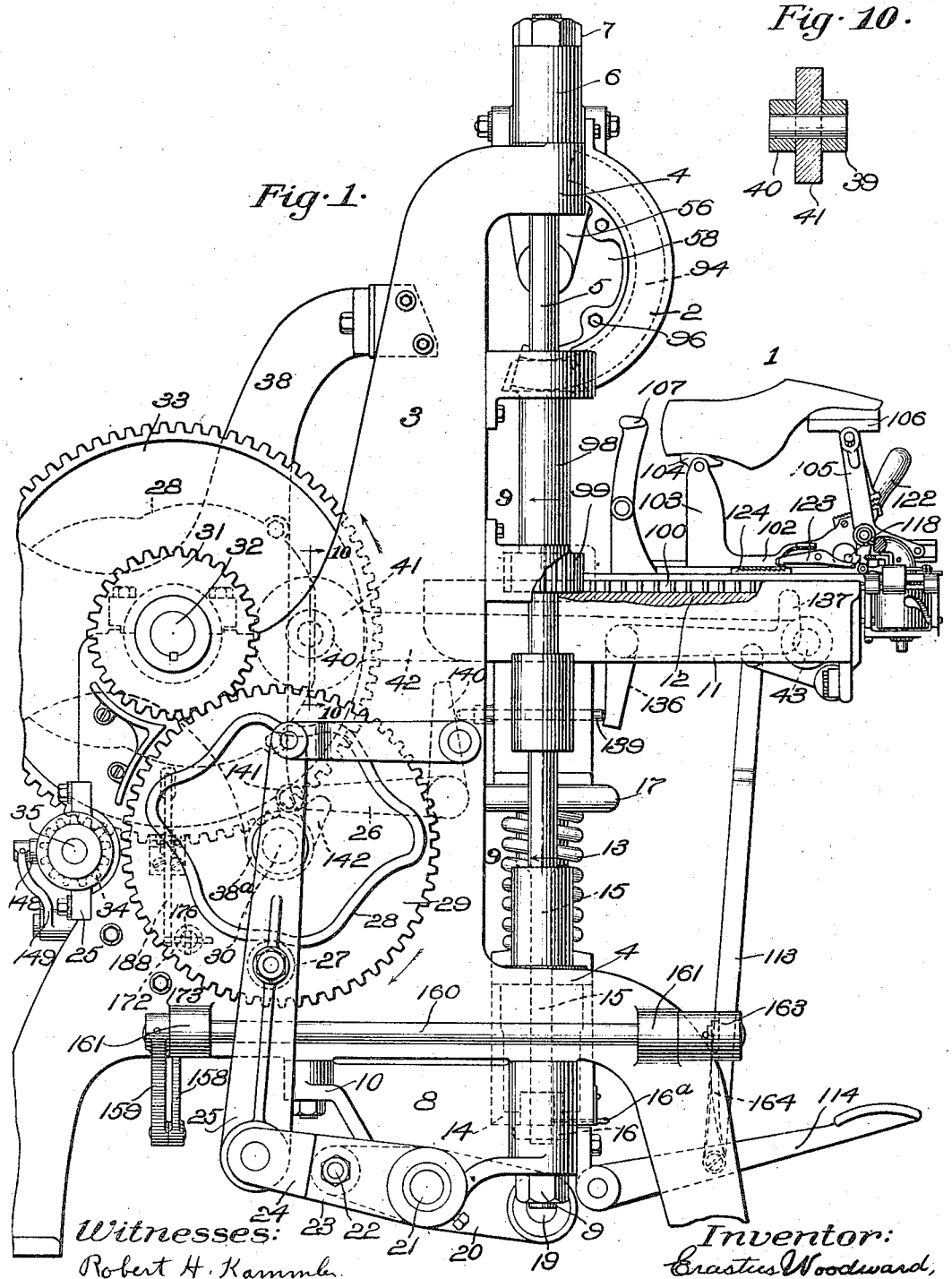

E. WOODWARD.
SOLE LAYING AND LEVELING MACHINE.
APPLICATION FILED APR. 13, 1907.

Patented May 17, 1910.

Witnesses:
Robert H. Kammler
Jesse G. Holton

Inventor:
Erastus Woodward,
by Emery & Booth,
Att'ys.

E. WOODWARD.
SOLE LAYING AND LEVELING MACHINE.
APPLICATION FILED APR. 13, 1907.

958,057.

Patented May 17, 1910.
9 SHEETS—SHEET 3.

Witnesses:
Robert H. Kammler.
Jesse G. Holton.

Inventor:
Erastus Woodward,
by Emery Booth,
Attys.

E. WOODWARD.
SOLE LAYING AND LEVELING MACHINE.
APPLICATION FILED APR. 13, 1907.

958,057.

Patented May 17, 1910.

9 SHEETS—SHEET 4.

Witnesses:
Robert H. Kammler
Jesse A. Holton

Inventor:
Erastus Woodward,
by Emery Booth,
Att'ys.

E. WOODWARD.
SOLE LAYING AND LEVELING MACHINE.
APPLICATION FILED APR. 13, 1907.

958,057.

Patented May 17, 1910.

Witnesses:
Robert H. Kammler
Jesse G. Holton

Inventor:
Erastus Woodward,
by Emery & Booth,
Att'ys.

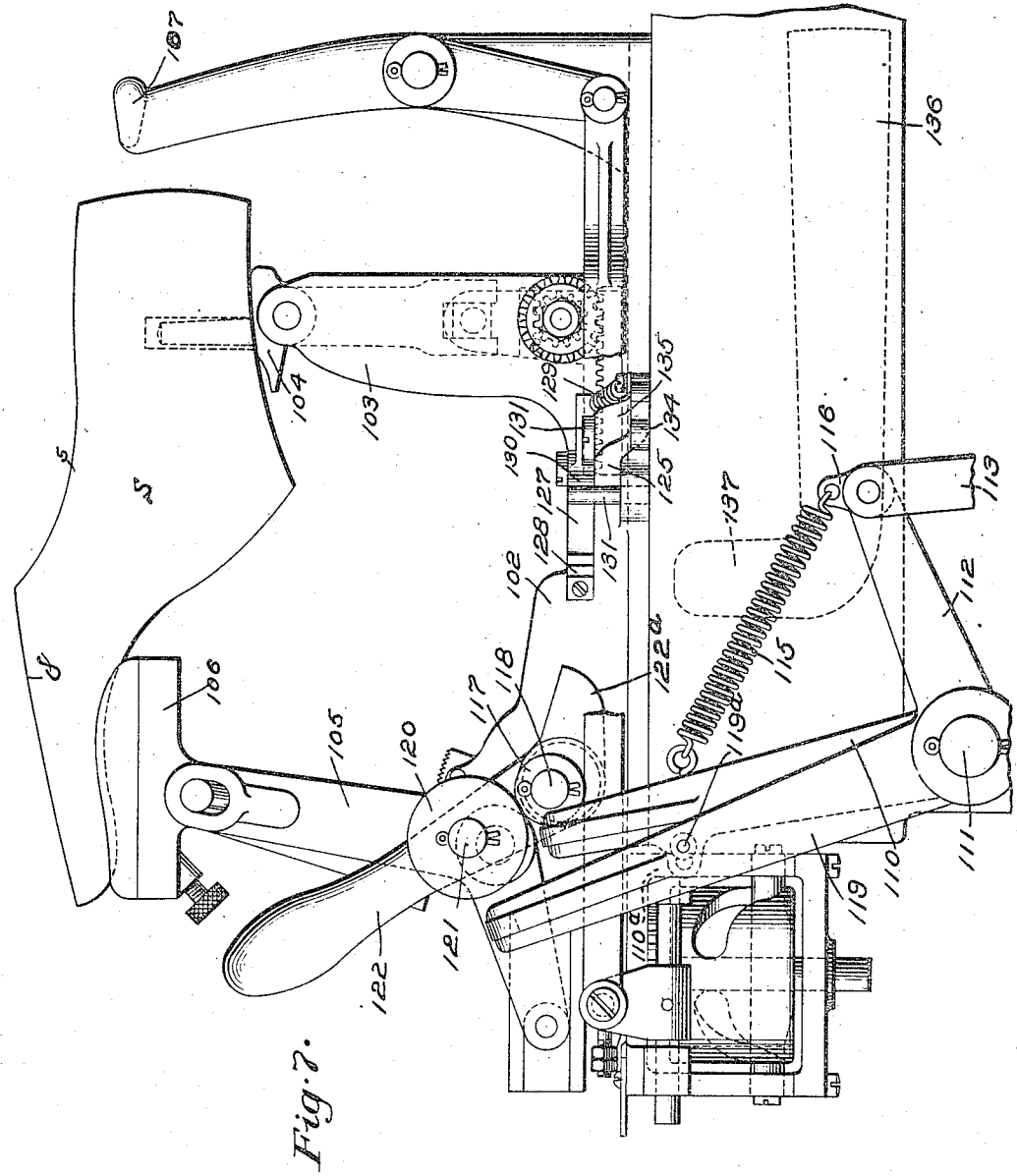

E. WOODWARD.
SOLE LAYING AND LEVELING MACHINE.
APPLICATION FILED APR. 13, 1907.

958,057.

Patented May 17, 1910.
9 SHEETS—SHEET 7.

Witnesses:
Robert H. Kammler.
Jesse J. Holton.

Inventor:
Erastus Woodward,
by Emery & Booth,
Att'ys.

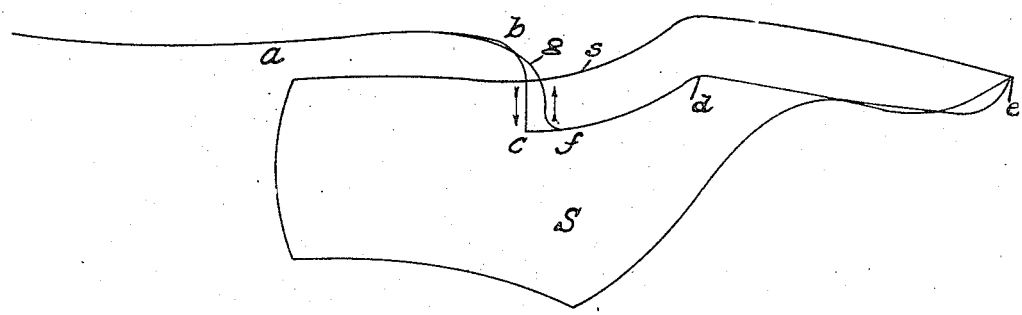
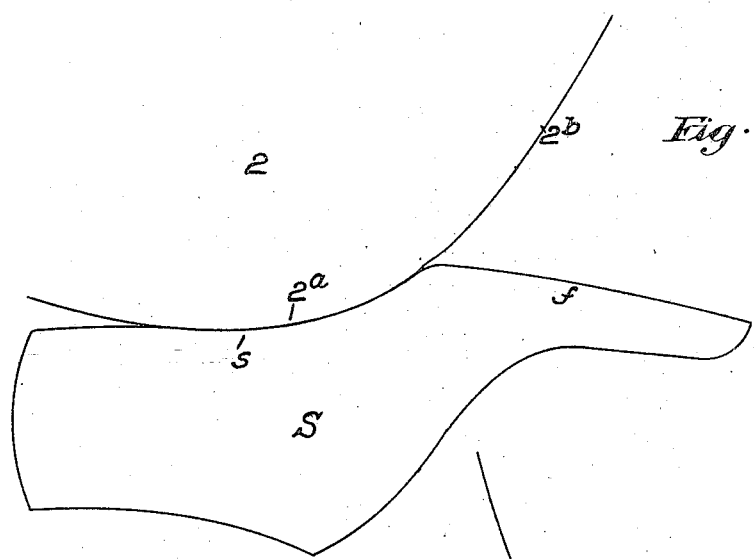
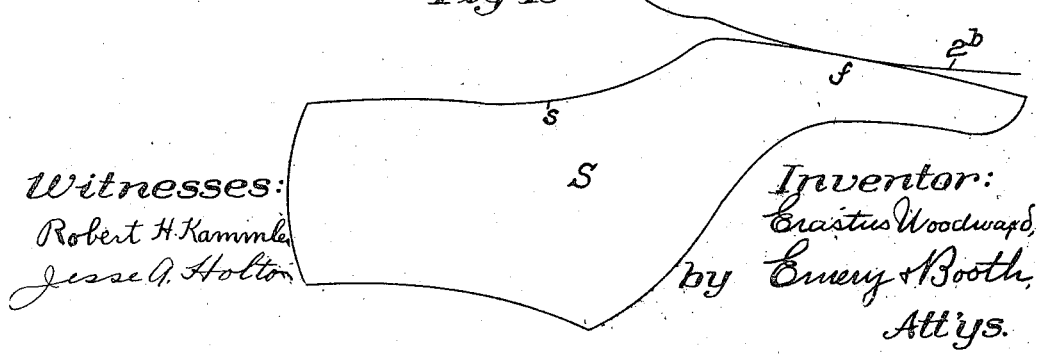

E. WOODWARD.
SOLE LAYING AND LEVELING MACHINE.
APPLICATION FILED APR. 13, 1907.

958,057.

Patented May 17, 1910.
9 SHEETS—SHEET 9.

Witnesses:
Amelia M. Ross
Edward H. Palmer

Inventor:
Erastus Woodward.
by Emery H. Booth
Att'y.

UNITED STATES PATENT OFFICE.

ERASTUS WOODWARD, OF SOMERVILLE, MASSACHUSETTS, ASSIGNOR, BY MESNE ASSIGNMENTS, TO THOMAS G. PLANT, OF BOSTON, MASSACHUSETTS.

SOLE LAYING AND LEVELING MACHINE.

958,057.  Specification of Letters Patent.  Patented May 17, 1910.

Application filed April 13, 1907. Serial No. 367,912.

*To all whom it may concern:*

Be it known that I, ERASTUS WOODWARD, a citizen of the United States, residing at Somerville, in the county of Middlesex and State of Massachusetts, have invented an Improvement in Sole Laying and Leveling Machines, of which the following description, in connection with the accompanying drawings, is a specification, like numerals on the drawings representing like parts.

My invention relates to sole pressing machines and more particularly but not exclusively, to such as are known to the trade as sole layers.

One of the objects of my invention is the production of a machine that combines the advantages of the direct pressure and oscillatory types of machines and to that end comprises simple and effective means for presenting a jacked shoe in predetermined position relative to the form, for bringing the latter and said shoe together under direct pressure for laying the sole over a predetermined portion of the shoe, and for thereafter producing a relative rolling action between the shoe and form for effectively laying and leveling the sole upon and over a separate area or portion of the sole. All the above, however, with other novel features and objects of my invention, will be best understood and appreciated by reference to the following description, when taken in connection with the accompanying drawings of a machine embodying one form of my invention and selected for purposes of illustration, its scope being more particularly pointed out in the appended claims.

Figure 2:
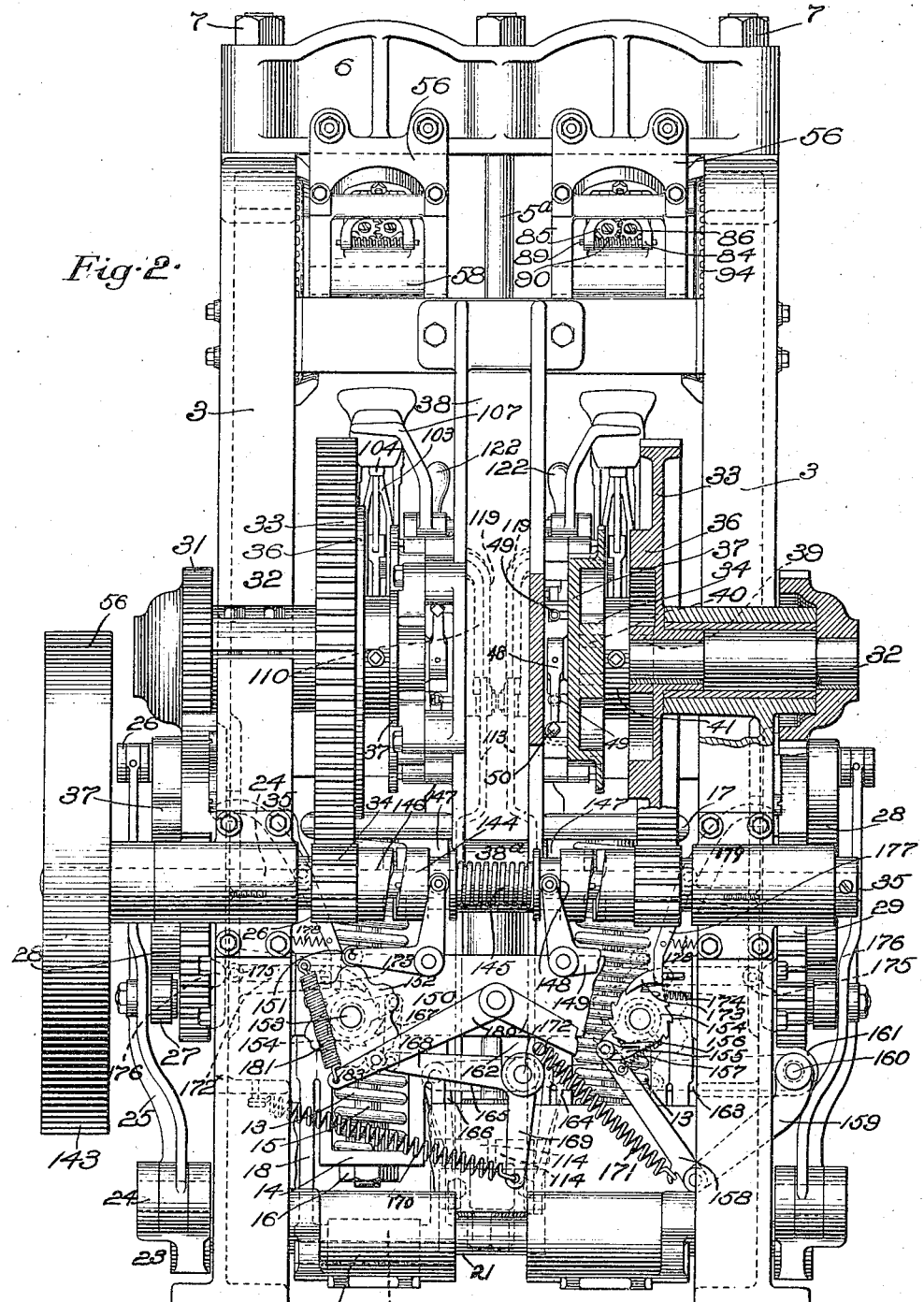
Figure 3:
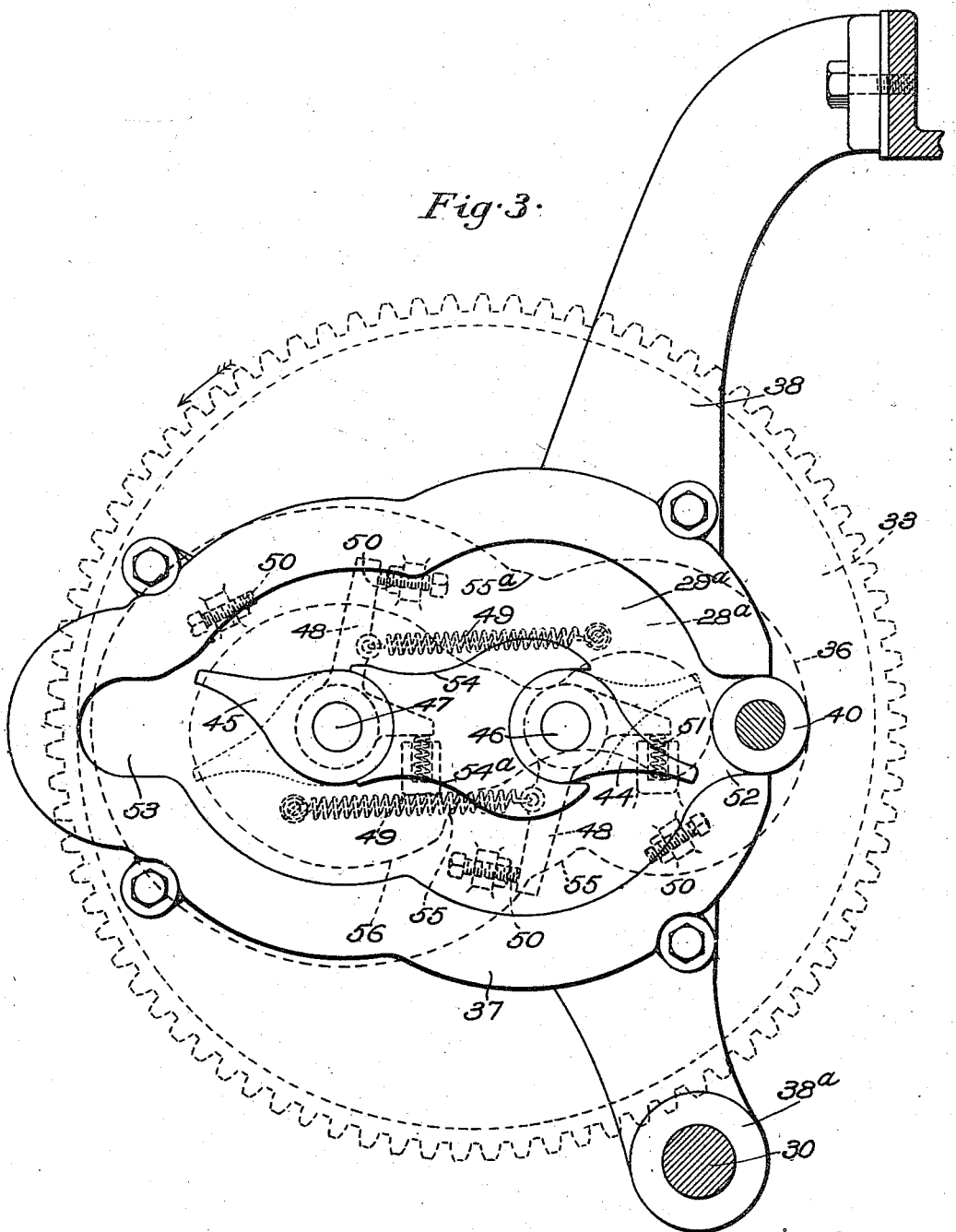
Figure 4:
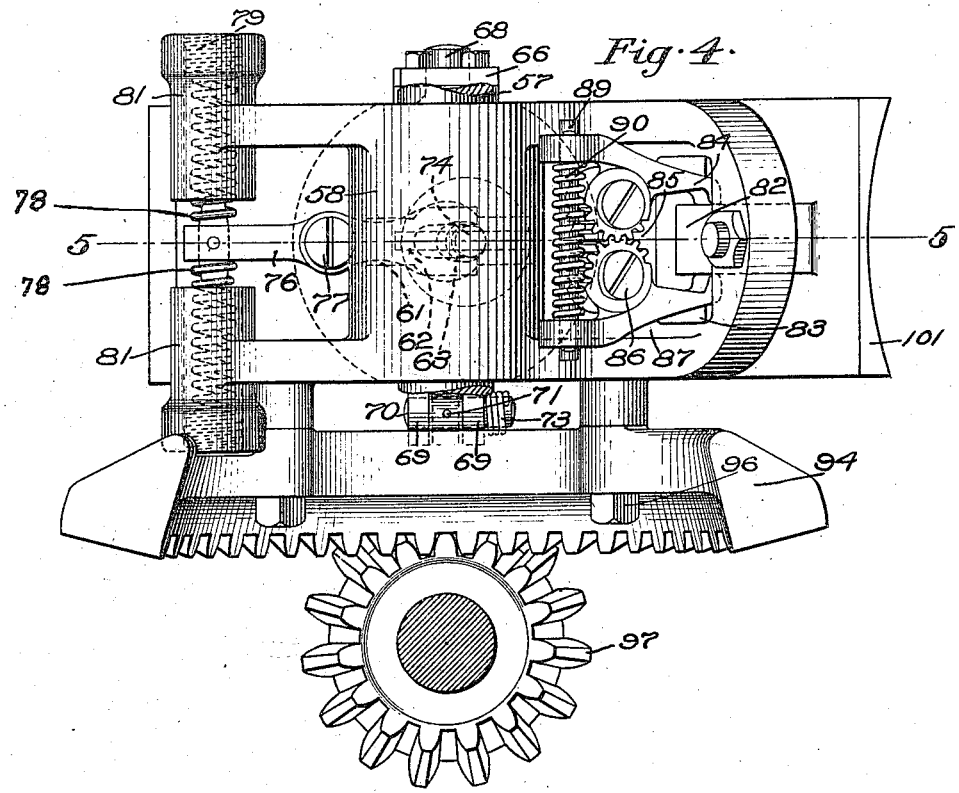
Figure 5:
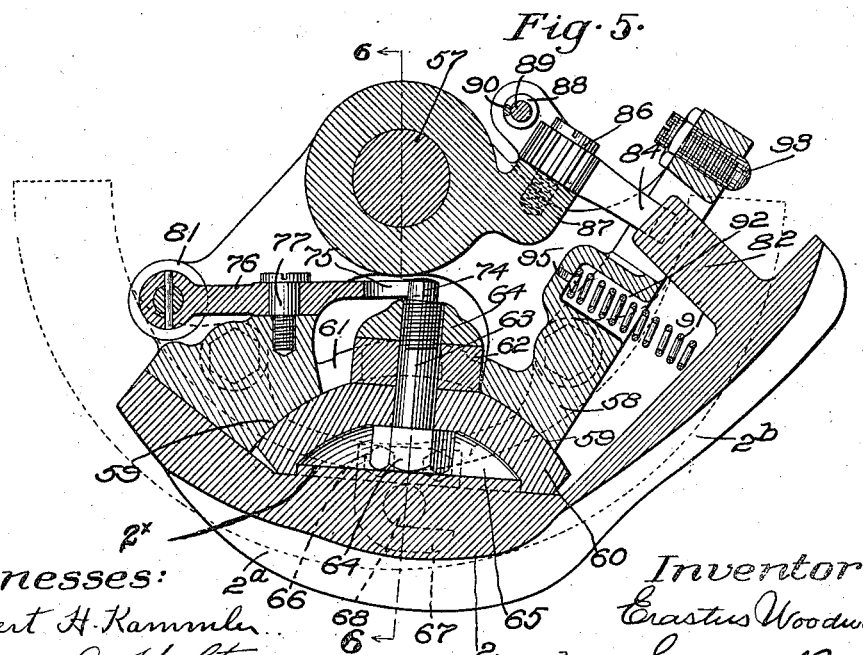
Figure 6:
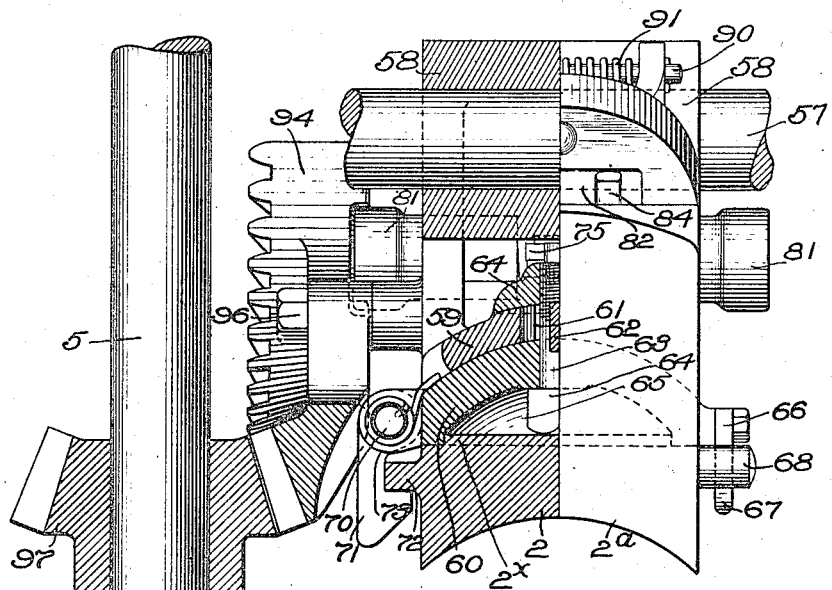
Figure 9:
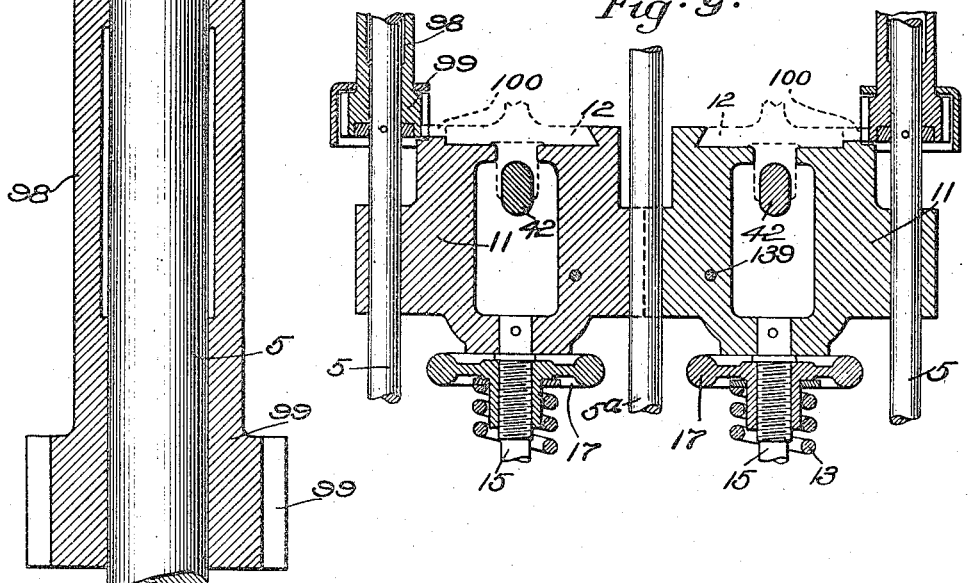
Figure 8:
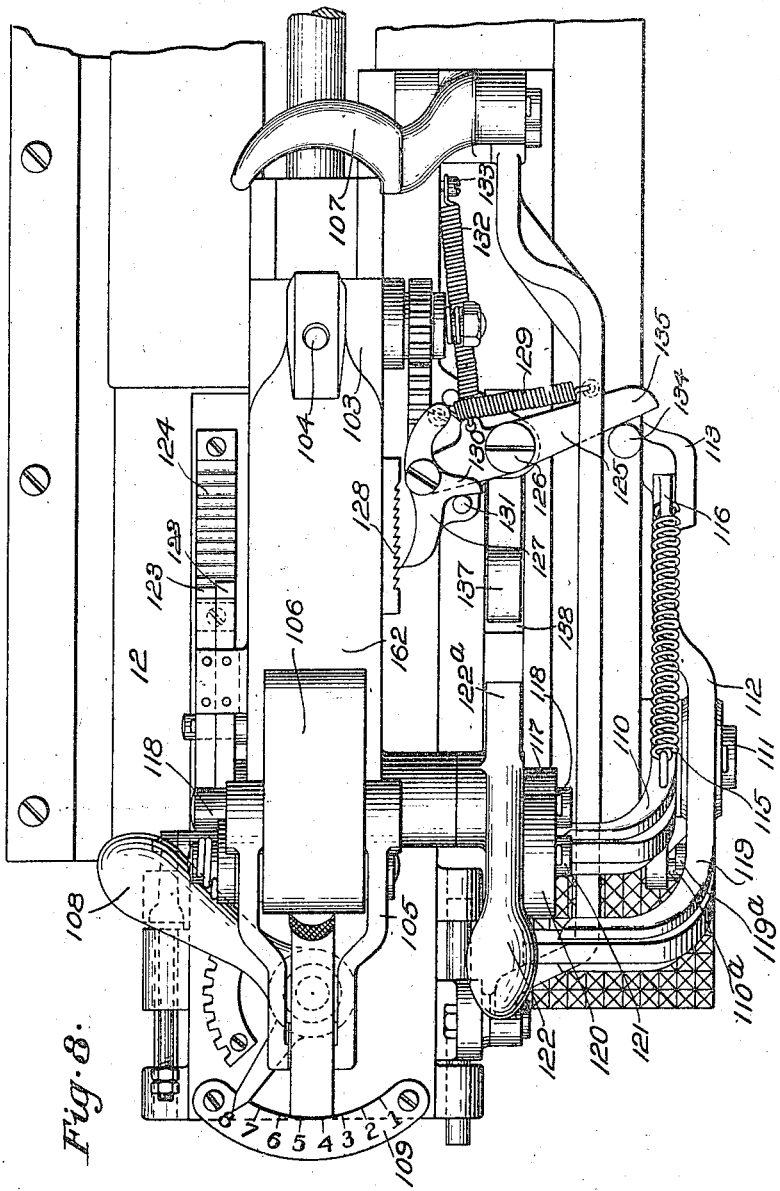
Figure 14:
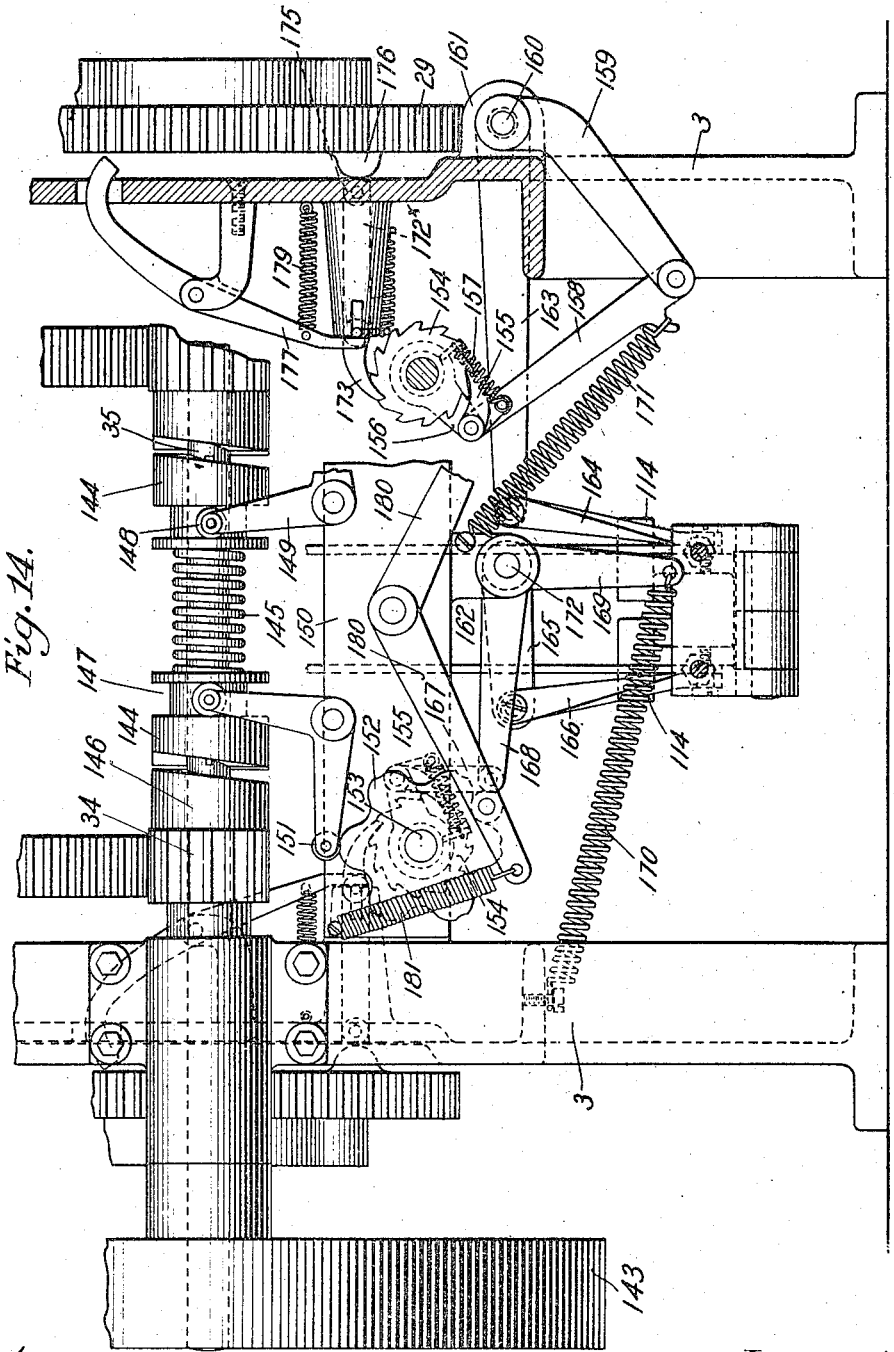

In the drawings; Figure 1, is a left hand elevation partially broken away, of a machine embodying a preferred form of my invention and selected for purposes of illustration herein; Fig. 2, a rear elevation of said machine, with certain of the parts broken away for convenience of illustration; Fig. 3, an elevational detail, on a somewhat larger scale, of the stationary cam and the coöperating rotary cam (the latter indicated in dotted lines), that impart suitable movements to the jack slide to position and present the jack in operative relation to the form; Fig. 4, a detail, in plan, of the oscillatory form; Fig. 5, a longitudinal and vertical section thereof, on the line 5—5, Fig. 4; Fig. 6, a vertical and transverse section on the line 6—6, Fig. 5; Fig. 7, a left hand elevation of the jack to show the mechanism for jacking and unjacking the last and its shoe; Fig. 8, a plan view thereof; Fig. 9, a vertical sectional detail taken from the rear, on the line 9—9, Fig. 1, to show the vertically movable table upon which the jack is slidably mounted; Fig. 10, a vertical sectional detail on the line 10—10, Fig. 1, to show the head of the table actuating rod and the cam rollers mounted thereon, to which reference will be made; Figs. 11, 12 and 13, are diagrammatic views to represent the relative movements of the form and the shoe during the operation of the machine; Fig. 14 is an enlarged rear elevation showing the star wheels and clutching devices for connecting the driving shaft to either one of the twin machines, and the provisions for stopping the machine at the end of a cycle of operations.

Referring to the drawings and to the particular embodiment of my invention selected for illustration therein, the machine is provided with a plurality of work supporting jacks and coöperating forms, two of such jacks and their coöperating forms being preferably provided in the present instance and constituting a twin machine, each of said jacks and its form, however, being entirely independent of the others.

As the two sides or halves of the twin machine are substantially alike in construction and operation, the description of but one side or one half of the machine will be sufficient, such slight differences of construction as may exist between the two sides or halves of the machine being pointed out in the proper places.

Referring to Fig. 2, the machine is provided with suitable side frames 3, having forwardly extending lugs 4, Fig. 1, apertured to receive the outer vertical guide rods 5. The heads of these rods extend through the upper frame lugs 4, to receive a stationary horizontal cross head 6, connecting the heads of said frames and rigidly secured thereto by clamping nuts 7, Figs. 1 and 2, threaded upon the projecting heads of said rods. The bases of said side frames are similarly tied together by a bottom girder 8 mounted upon the lower ends of said guide rods 5 and secured thereon and to said frames by nuts 9, said bottom girder having a pair of rearwardly extending side arms (see Fig. 1), that are also bolted to the side frames at 10.

The upper cross head 6 and the bottom girder 8 are also tied together by an intermediate vertical guide rod 5ª, Fig. 2, which is mounted and secured thereto in a manner similar to that employed in securing the side guide rods 5. By this construction, I secure a rigid supporting frame upon which the operative parts of the machine may be suitably mounted.

Referring now to Fig. 1 the jack is represented above which is mounted an oscillatory form 2, the combined movements of said jack and form coöperating to lay the sole of a shoe S mounted upon said jack. Said form 2, as will be more fully described later, has a mold face 2ª Fig. 5, which is shaped to mold the shank s of the shoe sole by direct pressure, with an adjacent portion 2ᵇ for molding and laying the fore part, f of the sole, by a rolling pressure, produced by rolling or oscillating the form and shoe, one upon or relative to the other, herein from the shank to the toe end of the shoe and back again to the shank.

In carrying out my invention suitable means are provided first, to present the jack and its shoe in predetermined position relative to and beneath the form; second, to bring the jacked shoe into direct pressure contact with the form effectively to lay the sole by direct pressure over a predetermined area thereof, such for instance, as the shank of the shoe; third, to produce relative rolling or oscillating pressure contact between the shoe sole and said form for laying and molding the shoe sole over an adjacent portion or area thereof, here shown as the fore part, f; and finally, to separate the form and jack and return the latter to its outer shoe-receiving or shoe removing position, all of said movements being effected automatically. The jack, 1, is carried on a jack slide 12 (Fig. 8) mounted to slide horizontally on a table 11, which in turn is mounted to slide vertically between the guide rod 5ª (Fig. 9) and the outer guide rod 5. This table is carried upon a spring 13, seated at its lower end upon a cross head 14 mounted to slide freely upon said guide rods. Within said spring is a rod 15, secured at its upper end to the table 11, said rod depending through the cross head 14 and having threaded upon its lower end, below said cross head, a nut 16, by which to limit the separation of said table and the cross head. The normal tension of said spring may be varied, at will, by a hand wheel nut 17, threaded upon the upper end of said depending rod 15 and against which the upper end of said spring is seated.

The nut 16 may be held in adjusted position by any suitable means as, for example, the spring latch 16ª adapted to engage notches (not shown) in said nut.

The cross head 14 is carried by a pair of vertical links 18, Fig. 2, pivotally connected thereto at their upper ends and at their lower ends, as at 19, to the front end of a horizontal lever 20, Fig. 1, which is fulcrumed upon a horizontal pin 21, Figs. 1 and 2, in the bottom girder 8. The rear end of this lever is connected by a horizontal stud or pin 22 to a lever 23, standing beside it, the front end of the latter, Fig. 1, being fulcrumed on the outer projecting end of said pivot pin 21. The movements of this lever 23, through said connecting pin 22 cause corresponding and simultaneous movements of the lever 20 to elevate or depress the cross head 14 connected therewith thereby elevating the table supporting spring 13 and lifting the jack carrying table 11 to vertically present the jack, 1, thereon, to the form, 2, above the same, as will be hereinafter described.

The table elevating lever 23, has jointed to it at 24, an upright operating lever 25, supported at its upper end by a swinging link 26, connected with the frame. Between its ends, said upright operating lever has a roller stud 27, which underlies a cam 28 on the face of a wheel 29, fast on a horizontal shaft 30 mounted in the frame. This wheel 29 is geared to and driven by a pinion 31 on an upper shaft 32, also journaled in said frame. This upper shaft has a gear wheel 33, driven by a pinion 34 on the main drive shaft 35 of the machine, rotation of which through the mechanism and cam described, causes appropriate elevation and depression of the jack carrying table.

It is desirable that the jack carrying table be thrown forward after it is depressed, to present the jack for convenient removal of the shoe and for the application of a new shoe, after which said table should be drawn into the machine for presenting it to the laying or leveling form. To this end I have provided the following mechanism; at its inner face the gear wheel 33, described, is provided with a cam 36 (see Fig. 2 and dotted lines Fig. 3), opposite which is a somewhat similar, but stationary cam 37, bolted to a vertical bracket 38 at the rear of the machine. The lower end of this bracket is formed to provide an intermediate or central bearing 38ª Fig. 1, for the lower shaft 30 already described. The movable and stationary cams 36 and 37, described, are provided respectively with facing cam grooves to receive respectively the oppositely extended rollers 39, 40, (see Fig. 10 and dotted lines Fig. 2), carried by the hubbed head 41 of a horizontal actuating rod 42, pivotally connected at its front end Fig. 1, as at 43, with the jack slide 12 referred to. The stationary cam, 37, which receives the inner roller 40 of said actuating rod, acts as a guide to direct the movements of said roller, and hence to determine the movements of the connected jack slide, while the groove of the rotary cam acts upon the opposite roller 39 to produce the desired movements of said roller 40, in the said stationary cam.

The stationary cam 37 is of general 8 shape and is provided at its opposite ends with movable switch tongues 44, 45 mounted respectively on short shafts 46, 47, which at their outer ends have operating arms 48, acted upon by springs 49, which tend to retain said tongues normally in their full line position, Fig. 3. These positions are made adjustable by stop screws 50, likewise the opposite or dotted positions. Spring buffers are provided at 51, to cushion the spring actuated movements of said tongues. The cam 37 is also provided at its opposite ends with recesses or pockets 52, 53, each adapted to receive the roller 40.

When the movable cam 36 is rotated, it causes the roller 40 on the opposite side of the head of the table actuating rod, 42, to be moved to the left, Fig. 3, causing said roller first to be moved directly to the left to clear the pocket 52, and then to be deflected by the tongue 44 up and along the upper run of the cam groove until it reaches the point thereon marked 54, Fig. 3, which is nearest to the center of the rotary cam. At this moment, the turning movement of the rotating cam, brings into position to act upon its roller 39, a concentric portion of its cam groove, marked 55 in Fig. 3, with the result, that when the stationary cam roller 40 reaches the point 54, referred to, thus drawing the jack table inward or to the left for substantially one half its stroke, the action of the said concentric part 55 of the rotating cam, produces a pause or dwell in the movement of the stationary roller 40 and the jack table, during which dwell the high part of the cam 28 depresses the jack elevating arm 25, which acts to elevate the jack table and bring the shoe on the jack securely against the opposed form above it.
After this has taken place, continued rotation of the cam 36, causes a resumption of travel of the roller 40 in the stationary cam until the limit of its travel at the left Fig. 3, is reached, said roller engaging the switch tongue 45, and depressing it so that it may direct said roller into the pocket 53, after which said switch tongue springs back into its normal full line position. At this point the roller 40 has completed the inward movement of the jack table, whereupon continued rotation of the cam 36 reverses the movement of the roll, causing said roll 40 now to be withdrawn from said pocket, the now elevated switch tongue 45 deflecting said roller down and along the lower rotary run of the stationary cam to its supporting position. On its return movement, said roller 40 and its connected jack table are caused again to dwell at the point 54ª Fig. 3, corresponding nearly, but not necessarily, to the point 54 at which it pauses on its inward movement, the roller 39 at that instant being engaged by another concentric portion 55ª. This return pause or dwell gives opportunity for the cam 28 to drop the jack from its form preparatory to continued outer movement of the jack into shoe removing position, the switch tongue 44 yielding to permit the roller to pass on said return and then to rise to its full line position.

The described arrangement of rotating and stationary cams operate to provide a maximum in and out travel of the jack table with a minimum diameter of rotating parts.
If it were attempted to obtain this same throw or table travel, from a single rotary cam, said cam would necessarily be of a diameter twice that of the extreme throw or travel of the table or twice the length of the stationary cam. It will be obvious, therefore, that the described construction economizes much space.

The stationary cross head 6 is provided between the outer and intermediate guide rods 5 and 5ª with depending hangers 56 for a pivot shaft 57 (see Figs. 4 and 5) on which is mounted a segmental oscillatory form carrier 58. At its under side, this carrier is centrally provided with a concave spherical bearing surface 59 (Figs. 5 and 6), to receive the spherical surfaced portion of a mold or form head 60. The carrier 58 is centrally provided with a longitudinal keyway 61, best shown in dotted lines Fig. 4, to receive a key 62, which extends through and is carried by the shank of a screw 63. This screw projects upward through an aperture in the top of said head 60, and carries upon its threaded end a nut 64 a portion of which overlies the oscillatory carrier 58 and serves to retain the head 60 in engagement with said carrier. The nut 64 may be turned to vary the frictional contact between the opposed bearing faces of the head and its supporting carrier 58 within limits imposed by the spacing key 62, which prevents the bearing faces from biting against one another to retard the movement of the said head, 60, the latter having at all times a universal movement, to permit the form to conform readily to the work presented to it.

The head 60 has a concave recess 65 at its under side not only to receive the head of the screw 63 but also to receive a circular projection 2ˣ (Fig. 5) formed upon the upper and inner face of the mold or form 2, said projection serving properly to position and to seat the form on said head. That said form may be removably secured to its carrying head, the latter is provided at one side, the upper side, (Fig. 4), with a depending plate 66, having a hook 67 (Fig. 5) to receive a horizontal pin 68 projecting from the adjacent side of the form 2. At its opposite side, said head is provided with ears 69 (Fig. 4), for a pivot pin 70, provided intermediate said ears with a latch 71, the latching end of which is normally retained in inner position to engage a projecting lug or lip, 72 (Fig. 6), of said form 2, by a spring 73 surrounding said pin. By swinging the latch outwardly against the action of said spring, the form may readily be removed and a new form substituted, this arrangement permitting the ready positioning and use of forms having different mold faces for laying or leveling the soles of different sizes, widths, and styles of shoes. The shape of the form provided is such, however, that it is adapted to operate upon shoes of different size, three such forms, adapted for the larger, smaller, and intermediate sizes, being ordinarily sufficient for all of the eight sizes of shoes or lasts usually made.

The construction of the form carrying head and its oscillatory carrier and the manner of mounting the same is such that the form has a limited universal movement, so that it may swing longitudinally or laterally to enable it automatically to seat itself upon the sole of the shoe as the latter is brought into direct pressure contact therewith and also during the subsequent rolling action between them. Means, however, are provided for normally maintaining the form in a central position, both laterally and longitudinally, that is to say, with the medial line of the form in a vertical plane extending from front to back of the shoe sole and corresponding to the line 5—5 (Fig. 4).

For normally maintaining the form in such central position and for restoring the same thereto after a lateral tipping or rocking movement, the reduced end 74 of the screw 63 is embraced by the forked end 75 of a horizontal centering arm 76, pivoted at 77 to a lug of the carrier 58. The outer end of this centering arm is centered between coil springs 78 (Fig. 4), seated at their outer ends upon screw plugs 79 threaded into the outer ends of the socketed lugs 81. These springs act normally to center the arm 76 as indicated in Fig. 4, thereby yieldingly centering the form 2, but permitting swinging movement thereby to conform to the shoe presented to it.

The tension of the springs 78 may be readily varied by adjustment of the screw plugs, 79, to tip or rock the form to a predetermined or desired position relative to the sole to be operated upon.

For normally maintaining the medial line of the form in the central longitudinal position referred to and to return the same to said position after a lateral swinging movement, the front end of the form is provided with an inwardly projecting lug 82, (Figs. 4 and 5) extending through a slot 83 in the front end of the supporting carrier 58. The head of this lug is received between the inturned ends of a pair of levers 84, pivotally mounted, as by the pivot screws 86, upon lugs 87 on the supporting carrier 58. These levers are provided with intermeshing gear teeth 85 (Figs. 4 and 5), to cause like movement of the two levers. The opposed and upper arms of these levers 84 are provided with apertures 88 (Fig. 5), to receive a horizontal pin 89, surrounding which is a coil spring 90, interposed between said arms and normally acting to separate them to swing them on their fulcra 86, to cause inward movement of the inturned ends thereof to longitudinally center the lug 82 and its connected form.

By referring to Fig. 5, it will be noted that the form 2 is also capable of rocking or oscillating longitudinally, relative to its carrier and the shoe sole. The form, however, is normally swung forward (Fig. 5), relative to the oscillatory carrier 58, by means of a coil spring 91, interposed between the inner face of the form and the bottom of a socket 92, formed in the front portion of the carrier 58, said spring being secured by a screw 95 to the bottom of said socket, to prevent its displacement. This spring, however, yields to permit the form to rock or oscillate longitudinally for automatically adapting and seating itself upon the sole presented thereto. Upon relative separation of the form and shoe, this spring acts to return the form to a predetermined central or centering position, in which it is normally carried and which is represented in Fig. 5, with the spacing key 62 in limiting engagement with the outer or front end wall of the bearing slot 61.

An adjustable stop screw 93, mounted in the front portion of the frame 58, limits the inward or rearward longitudinal movement of the form. This adjustment provides a convenient means for limiting the rocking movement of the form so as to maintain the molding face of the fore part of the mold at predetermined distance from the axis of the shaft 57 of the oscillating support 58 and hence permits varying or regulating the amount of pressure produced thereby upon the fore part of the sole.

Reference has been made to the fact that the form and its carrier are mounted for oscillatory movement, produced at predetermined times in the operation of the machine. To secure this movement the outer side of the oscillatory carrier 58 is provided with a segmental gear 94, secured thereto by any suitable means, as bolts 96. The teeth of this gear are in mesh with a bevel gear 97, at the head of a sleeve 98, loosely mounted on the adjacent guide rod 5; the lower end of said sleeve having a gear 99, in mesh with a horizontal rack 100 (Figs. 1 and 9), carried at the side of the jack slide 12.

In operation, the horizontal movements imparted to the jack slide, through the actuation of the rod 42, reciprocate the rack 100 to oscillate the gear 99, and thereby the carrier 58, and its form 2. This oscillatory movement is effected simultaneously with and corresponds to the movements of the jack slide and varies with said movement, so that when the jack slide is brought to rest or has a dwell in its movement, there will be a corresponding dwell or rest in the movement of the form.

The form 2, of course, has a molding face adapted by its contact with the sole, to mold the same to the desired shape or style, said face being complemental to the desired shape of the shank and forepart of the shoe. In the operation of the machine, as the jack is drawn by the action of said cams 36, 37, inwardly beneath but clear of the form, the latter is swung to bring it into the position shown in Fig. 5, and diagrammatically in Fig. 12, with its shank molding face 2ª in position above and in readiness to engage the shank of the shoe when the latter is lifted into contact therewith. It has already been stated that, after the jack has been drawn inward for a part of its travel and when the roller 40 reaches the part 54 of the stationary cam 37, there is a dwell or pause in such inward movement, during which the elevating cam 28, acts to lift the jack to bring the shank of the shoe thereon into direct contact with the form 2, also momentarily at rest, as illustrated in Fig. 12. The initial elevation of the jack causes the entire length of the shank, s, of the sole, or so much thereof as may be desired, to make direct pressure contact with the shank molding portion, 2ª, of the form, the dwell or duration of said contact being sufficient to lay the said portion of said sole and to cause it to adhere to the shoe, to prevent both lateral and longitudinal displacement or creeping during the subsequent laying of the forepart of said sole.

Continued operation of the machine, causes the roller 40 to resume its traverse of the stationary cam 37, to draw the jack into the machine, which causes the form also to roll from the shank forward on the forepart of the sole to the toe thereof, as indicated in Fig. 13, to lay the sole from said shank to the toe and until the roller 40 reaches and enters the recess or pocket 53 at the left of the cam Fig. 3. Continued and uninterrupted operation of the machine causes said roller 40 now to travel forward along the lower path of the stationary cam and causes the jack to advance to the front of the form which rolls back upon the forepart to the shank, at which point the jack and roll are arrested to permit the elevating and depressing cam 28 to drop the jack and its shoe away from the form. The outward travel of the jack and form are then resumed to provide sufficient clearance and to present the jack conveniently for the removal of the shoe.

The relative movements of the jack and form are diagrammatically represented in Fig. 11, the line a—b—c—d—e representing a line that would be traced upon the side of the jack by a stationary point on the machine as the jack moves from its outer to its inner position and the line e—f—g—a that traced during the reverse movement of said jack, the portion b—c represents the vertical elevation of the jack during the dwell in the inner movement thereof and the portion f—g the return movement or depression of the jack during the dwell in the outer movement of said jack, the latter dwell taking place just prior to the return of the form and jack to their initial position of direct pressure contact. By inverting Fig. 11, the said line a—b—c—d—e represents the inner movement of the jack and shoe, and the line e—d—f—g—a, the outer movement, the points e and f representing the two relative horizontal positions of the jack, when the jack and form are brought together and separated. The distance between these lines and the bottom of the last approximately represents or corresponds to the amount of compression of the spring 13 produced by the action of the cam 28 during the laying of the sole and which, as here shown, is uniform over the entire portion of the sole that is brought into pressure contact with the form, first, by its direct contact with the shank and then by the rolling action over the forepart, both in the inner and outer movements of the jack.

With my machine, it will be noticed that one portion of the sole, herein the shank, is laid or acted upon by direct pressure, I having found this best adapted for the initial contact of the form with the sole, since it does not tend to displace the sole, my machine in this respect following the well known direct pressure machines and securing the principal advantages thereof. The remaining portion of the sole, herein the forepart, is acted upon by rolling or oscillating pressure, best adapted for the forepart work. My machine, therefore, combines the advantages of the direct pressure and oscillating pressure machines, providing for the use of each kind of pressure where it is most needed and will perform the best work. It will be observed however, that the direct and oscillating pressures do not overlap or operate at any time upon the same area of the sole surface. The oscillations begin at the limit or boundary of the area receiving the direct pressure and press forward therefrom to the toe and back to, but not overlapping the direct pressure area, so that one does not supplant the other. My machine differs in this respect from attempts heretofore made to bring the sole and its form along a median or given line to obtain a direct contact from one to the other limit of the sole area, and thereafter oscillate the two, one upon the other and in opposite directions from said median line. Practice has shown the manner of operation of my present machine to produce distinct advantages over those just above referred to.

The elevating and depressing cam 28 is shaped to produce, when desired, a uniform pressure during the oscillatory action and of course such pressure might be varied by said cam although it is not herein shown as shaped to produce said variation. In order to produce this uniform pressure said cam has an active face that corresponds to that of the mold or form 2 and is complemental generally to that of the shoe sole operated upon, being the first instance in the art so far as I am aware, wherein a cam having such a face is employed to present either the shoe or the form in predetermined molding relation relative to one another during the laying or leveling operation.

In operating upon shoes of different sizes and widths, while it is usually necessary to change lasts for every change in size or width of shoe, it is obviously inconvenient to change the form so frequently, not only because of the greater bulk of the form and the difficulty and loss of time in making the change, but principally because of the great cost involved in providing a form for each size and width. It is a matter of individual judgment and preference how many sizes or widths of shoes shall be acted upon by one form. I have found it convenient to use, say three sizes of forms and find that even in the best grades of shoes the required quality of work may be performed thereby upon all the various sizes and widths of shoes, when a proper jack is provided therefor, which properly presents the shoes to the form. In providing a jack to secure this result, that is, to present each jack in predetermined position relative to the form, advantage is taken of the fact that the variations in length of the different sizes of lasts may be said to be divided between the toe and heel at either side of the ball line. This ball line, therefore may be selected as the invariable point of reference to which all lasts may be brought by the jack, which latter is made adjustable so as to bring the ball lines of all shoes mounted thereon always into position to provide one invariable or predetermined position of the ball line relative to the form, whatever be the length of the last.

In the particular embodiment of my invention herein selected for purposes of illustration, the specific construction of jack employed forms no part of my invention and therefore, only such parts need be described as are necessary to an understanding of the mechanism by which it is automatically jacked and unjacked. This jack comprises a sliding carriage 102, slidably mounted on the jack slide 12, and having at its end a suitable support 103 (Fig. 7) for an adjustable, pivoted last block and its heel pin 104, upon which the last is mounted in the usual manner. At its front end, this sliding carriage 102 is provided with pivoted supporting arms 105 for an adjustable, pivoted toe pad 106, upon which the toe of the last or shoe mounted thereon automatically seats itself and is supported. The jack slide is provided with a pivoted heel clamp or gage 107, which, together with the supporting arms of the toe pad, are simultaneously moved to predetermined size positions for the size of shoe to be operated upon by an adjusting handle 108 (Fig. 8), and its connected mechanism. A scale 109 (Fig. 8) is also provided for determining the position of said handle and the corresponding or appropriate size positions of the heel gage and toe support. The position of the heel gage determinately fixes the position of the ball line of the shoe when the jack carriage is moved to bring the heel or counter of the shoe into engagement therewith. For sliding this jack carriage 102 rearwardly on the jack slide to bring the counter of the shoe into the desired size position, and for depressing the toe of the shoe upon its supporting pad, automatically to seat the same thereon and also for jacking the shoe in position determined by such adjustment suitable mechanism is provided, which is automatically operated by starting the machine. The unjacking and reverse movements of the shoe or jack are also effected automatically upon stopping the machine, leaving the jack in its front, shoe-removing and receiving position on its supporting table 11. These mechanisms and movements I will now describe.

Referring to Fig. 7, the mechanism for moving the jack carriage 102 rearwardly upon and relative to the jack slide 12, for positioning the shoe, comprises a rocking arm 110, loosely mounted on a stud 111, suitably journaled on the jack supporting table 11. Also mounted on this stud and behind the arm 110 is a bell-crank lever 112, the short horizontal arm of which is connected by a vertical link 113 with the starting treadle 114, which extends forward to present its tread within ready reach of the operative's foot. The vertical arm 110 is connected by a spring 115 with an ear 116 on the inner end of the short arm of the bell-crank, so that as said arm is depressed, the arm 110, through said spring, swings to the right to bring its upper end, which extends inward horizontally toward the jack, into engagement with a roller 117 (Fig. 7), loosely mounted on the jacking shaft 118 of the jack carriage 102. The inward swinging movement of this arm, through the action of said roller 117, slides the jack inwardly or rearwardly to bring the counter of the shoe into engagement with the heel gage 107, which positions the adjusted shoe support to present said shoe in its predetermined size position relative to said form. The jacking of the shoe in this position, or, to express it differently, the depressing of the toe firmly upon the toe pad is effected by rotating the jack shaft 118 positively, that is, to the right (Fig. 7). As here shown, this movement is produced automatically by the action of the inturned end of the bell-crank arm 119 on a roller 120, a pivot at 121, on the jack operating lever 122, which swings said lever, rearwardly to rotate the jacking shaft and jack the shoe.

Upon starting the machine by the depression of the starting treadle, the link 113 is depressed and the bell-crank is oscillated or rocked to swing the jack carriage positioning arm inward, to cause engagement with the roll 117, to move the carriage rearwardly until stopped by the shoe counter bringing up against the heel gage 107, which being in its adjusted size position, presents the shoe in such position. Further depression of the link 113 and the short arm of the bell crank 112, however, is then permitted through the action of the spring 115, which yields while the arm 110 remains stationary to hold the carriage in its size position. The continued depression of this arm 112 swings its vertical arm 119 also rearward, and brings the head of said arm into engagement with the roller 120 and swings the same also rearward to produce the jacking movement of the last pin to depress and maintain the shoe firmly upon the toe support.

To lock the carriage in its predetermined size position to prevent displacement thereof after the treadle has been released, I provide a pair of spring pressed pivoted pawls 123 (Figs. 1 and 8), which are adapted to engage the teeth of a rack 124 on the side of the carriage and which hold it in the position upon the jack slide 12 to which it has been moved by the action of the arm 110. These pawls lock the jack carriage against reverse movement until the jacking shaft is turned in the reverse direction, to the left Fig. 7 to unjack the shoe.

The rock arm 110 and the bell-crank arm behind it are provided with suitable means, here shown as engaging pins 110ª, 119ª, whereby the bell-crank 119 after having returned far enough to permit the shoe to be unjacked picks up and also returns the arm 110 to the left (Fig. 7). Thus the jacking lever may be moved to unjack the shoe while the arm 110 still holds the carriage in place, following which said arm 110 is moved to the left, presently described, thereby permitting movement of the carriage 102 to its outer position on the jack slide. To produce this outward movement, which moves the shoe forward away from the heel gage, the jack slide is provided at its outer side, the left, Fig. 8, with a horizontal pawl carrying lever 125 pivoted as at 126 on a vertical pivot pin secured to the jack slide 12. At its inner end, this lever is provided with a pivoted pawl 127 which is controlled by a spring 129 and drags over the teeth of a rack 128 on the jack slide 12 as the pawl carrying arm of said lever swings rearwardly in the positioning movement of the shoe. During the operation of the machine and in reaching this position, the pawl engages an adjacent tooth of the rack, to prevent relative or reverse movement between them and cause them to move together when the pawl carrying arm 125 is swung in the opposite direction, during the forward movement of the jack as presently will be described. This pawl however, has a stop arm 130 which extends at right angles relatively to the pawl and is adapted to engage a stop pin 131 on the jack slide as said lever 125 is moved into the position shown in Fig. 8, to cause the disengagement of the pawl from said rack as the carriage reaches its outer position. The inner arm of this lever 125 is normally swung toward pawl engaging position, by means of a coil spring 132 connecting said arm with a pin 133 on the jack slide. The jack table 11, at a predetermined point thereon, is provided with a vertical pin 134 with which the outer arm 135 of said lever 125 engages in the outward movement of the jack slide.

In operation, as the jack slide is moved inward, or to the right Fig. 8, toward its inner position, the outer arm 135 of said lever 125 is drawn by its spring to the left. By this swinging movement of said lever, the pawl 127, through the action of its spring 129, is swung into engagement with the teeth of the rack and is caused to drag thereover until the jack slide reaches its innermost position, the pawl then resting in engagement with the rack and coöperating with the pawls 123 to lock the carriage against return movement during the laying or leveling operation. Upon completion of such operation, the jack slide is moved outward, to the left, Fig. 8, the outer arm 135 of said lever 125, at a predetermined point in the sliding movement of the jack slide, engaging the stationary pin 134, causing the pawl arm of said lever to be swung to the left about its pivot 126, and swing said pawl also to the left, thereby to push said jack carriage outwardly with its shoe that has been unjacked during the same outward movement, thus moving them away from the heel clamp and causing the heel pin to tip to its upright position to facilitate removal of the shoe. The said lever 122 is swung to the left, (Fig. 7), automatically, by the outward or return movement of the jack which causes the cam extension 122ª of said lever, then in its downturned position, to engage the upturned and elevated end 137 of a bell-crank 136, to be described. This rearward swinging movement of the jacking lever (to the left, Fig. 1), causes its roller 120 to swing the arm 119 also to the left, during which the pin 119ª picks up the pin 110ª, to cause movement of the arm 110 away from the carriage roller 117, subsequent to the unjacking of the shoe, and permit the carriage to be moved to its outer position on the jack slide.

The bell crank 136, Fig. 1, referred to, is pivotally mounted on the jack table 11 and its horizontal arm is provided with the upturned end 137 which plays in a vertical slot 138 in the jack slide 12. The depending short arm of this bell crank rests, under the action of gravity, against a pin 139, Fig. 1, horizontally slidable in the table 12. The opposite or rear end of this pin normally engages the vertical arm of a bell crank 140, Fig. 1, pivotally mounted on the frame. The long horizontal arm of this bell crank is provided with a roller 141, riding on the edge of a tappet cam 142 which, at the conclusion of the laying operation, elevates said arm causing the vertical arm of said bell crank 140 to swing outward, and producing corresponding movement of said pin 139 and the depending arm of the bell crank 136. This movement elevates the vertical, upturned end 137 of the bell crank 136, to place it in the path of the cam extension 122ª of the jack operating lever, so that as the jack slides outwardly at the completion of the laying movement and after the separation of the jack and form, said extension 122ª will engage said upturned end 137 and cause said lever to swing to the right Fig. 7, to unjack the shoe. By this construction it is apparent that the jacking and unjacking of the shoe are effected automatically, the jacking by depression of the starting treadle and the unjacking by the operation of the cam 142 on shaft 30, Fig. 1. Furthermore, the construction described also provides means for unlocking the shoe and moving it away from the heel gage 107 to facilitate its ready removal when in shoe removing position, and, also, the application of the next shoe to be operated upon.

Having described the novel movements of the last and its shoe and that of the form for molding the same and bearing in mind that there are in effect two sets of jacks and forms or two machines, it only remains to describe the starting and stopping mechanism by which each machine is operated. The mechanism provided for this purpose is best shown in Fig. 2 and comprises clutch means by which each machine with its jack and form is independently set in operation and is automatically released at the conclusion of the laying operation. To this end I provide a clutch for each machine or mechanism, controlled by its own independent treadle, heretofore referred to as the starting treadle 114.

As here shown, the drive shaft 35, is provided with a large pulley 143 Fig. 2, adapted to be rotated constantly from any suitable source of power thereby to produce continuous rotation of said drive shaft 35. Intermediate its bearings this shaft is provided with slidable clutch collars 144 a coil spring 145 surrounding said shaft between them. The outer faces of these clutch collars are provided with teeth to engage teeth formed upon the opposite inner faces of the hubs 146 of the loosely mounted pinion 34. The spring 145 normally acts to throw said clutch collars 144 outwardly into clutching engagement with the hubs of the adjacent pinions 34 to cause each of said collars and its coöperating pinion 34 to rotate together, said clutch collars or members being splined to said shaft and rotating constantly therewith. By arranging this spring 145 between the clutch collars 144, either collar may be separately or independently moved to effect clutching engagement with the adjacent gear pinion 34 to rotate it and actuate the jack, so that either jack may be independently operated. Means are provided for maintaining each of these clutch collars normally out of clutching engagement with the adjacent driving pinion gear 34 and since the mechanism is substantially the same for each side of the machine, the description of but one will be given. The longitudinally slidable clutch collar 144 is provided with a circumferential groove 147 to receive rolls or other studs 148 carried by the yoke arms of a bell crank 149 pivotally mounted on a cross plate 150 extending horizontally between and bolted to the side frames 3. The horizontal arm of this bell crank is provided with a roller 151 riding on the upper edge of a star wheel or cam 152, fast on a stub shaft 153 journaled in said cross plate. The construction is such that as the star wheel is rotated, said roller 151 is elevated or depressed, oscillating the bell crank 149 and causing the clutch collar to slide inwardly out of engagement with the clutch member of the pinion 35 when the roller is elevated and permitting it to slide outwardly into engagement therewith when the roller is depressed into the space between adjacent teeth of the star wheel 152, said outward movement being produced by the action of the coil spring 145 described.

In inoperative or unclutching position, the roller 151 of the bell crank is supported in its highest position, upon the end of a tooth of the star wheel and to permit said roller to fall, to throw in the clutch, the star wheel must be rotated to present a depression or space between its teeth to receive the roller. To produce this rotation, the shaft of said star wheel, which is the cam shaft 153, is provided at its front end (Fig. 2) with a ratchet wheel 154 fast thereon; which is actuated by a pivoted spring pressed pawl 155 on the end of an arm 156 pivoted on said shaft. This pawl engages the teeth of said ratchet wheel and is maintained in constant engagement therewith by a spring 157 connecting the same with the hub of its supporting arm. Depression of said arm 156 swings the pawl outwardly, to the right Fig. 2, which causes it to rotate the ratchet wheel proportionately to the movement of said arm and turn said star wheel. Said arm is depressed by a link 158 connected with the arm 159 of a rock shaft 160 (Figs. 1 and 2), said shaft for the left machine being journaled in lugs 161 at the bottom of the left side frame and that of the right machine in lugs 162, Fig. 2, depending from the vertical cross plate 150.

The outer rock shaft 160 is rocked to cause actuation of the ratchet and star wheels, as described, by means of a horizontal arm 163, the inner end of which is connected by a link 164, Fig. 1, to its starting treadle 114, the central rock shaft 172 being similarly connected by an arm 165 and link 166 with its starting treadle 114. The pawl carrying arm of the right machine, the left Fig. 2, as here shown, is connected by a link 167 to the horizontal arm of a bell crank 168 corresponding to the arm 159 of the left machine and pivotally mounted on the central rock shaft 160. This bell crank 168, however, is provided with a depending vertical arm 169 Fig. 2, having the lower end connected by a spring 170 with the right side frame and acting to normally elevate said pawl carrying arm. The arm 158 of the other or left machine, the right, Fig. 2, has a similar spring 171 connected with the lug 162 of the cross plate 150 normally to elevate the pawl carrying arm of said machine. By depressing the treadle 114 of either machine, the corresponding rock shafts 160 will be turned to depress the pawl carrying arm and cause rotation of the ratchet through the space of one tooth, thereby presenting a depression to the roller 151 of the clutch operating bell crank 149. This permits depression of the horizontal arm of the latter which swings the vertical arm thereof with its roller 148 outwardly to slide the clutch collar 144 into engagement with that of the toothed hub of the pinion 35 for starting the machine.

To provide suitable means for stopping the machine automatically at a predetermined time, herein at the conclusion of the laying operation and when the jack has been moved forwardly to shoe removing position, the ratchet, 154, is provided with a second pawl 173 on the inner end of a spring controlled pin $172^x$ arranged to slide in a suitable bearing or recess formed in the side frame 3. The outer end of this pawl carrying pin is provided with a roller 175 adapted to be engaged by a cam projection 176 on the inner face of the large gear 29. This projection is so placed that it strikes the roller as the jack is moved into its outer position and by its inward movement rotates the ratchet wheel through the space of one tooth correspondingly to rotate the star wheel to raise the roller 151 of the bell crank clutch from a depression and to elevate it to its highest position, thereby releasing the clutch and stopping the machine.

For securing the return of the slidable pin 172 to its outer position with its roller in position to be actuated by the cam projection 176, its pawl pivot is prolonged to engage a lever 177 maintained in engagement therewith by a coil spring 179 connecting said end with the frame and normally acting to swing said end and said pin to the right, Fig. 2. The upper arm of this lever normally lies in the path of the cam projection 176 to be engaged thereby after the clutch releasing movement has been effected, and moved to an outer position for subsequent engagement of its pawl carrying pin with said projection. The pin 172 and its cam actuated roll 175 are usually returned to and maintained in outer position by the action of its springs or the controlling spring 174 of the pin 172, but the lever 177 always returns the pin to its outer position irrespective of the action of said springs.

For maintaining the star wheels in position normally to elevate the rollers 151 or for positioning the teeth of the star wheels predeterminately beneath the said rolls, I provide means for turning or stopping said wheel always with the teeth in such position. In the present instance, said means comprise for each machine a lever 180 Fig. 2, centrally pivoted at its inner end upon the cross plate 150 and having its outer end connected by a spring 181 to said cross plate, normally acting to elevate the free end of said lever. Adjacent said spring the lever is provided with a roller arranged to enter a depression between the teeth of the star wheel when the roller 151 rests upon the top of a tooth. In any other position of said star wheel, the spring actuated roller engages the inclined face of an adjacent tooth and by its action therein rotates or turns the wheel to bring said roller to its intermediate position between said teeth, thereby presenting the top of the upper vertical tooth of said wheel to the roller 151 to raise the latter to its highest position. By this construction, whatever the movements of the stopping mechanisms the star wheels are always maintained in predetermined position relative to their actuating mechanism and accidental displacement from any cause is prevented.

In operation, the operative first, by means of the operating handle of the size adjusting mechanism of the jack, adjusts the jack to the size corresponding to the shoe and lasts to be operated upon and then places a lasted shoe upon the jack. He next depresses the treadle of the machine upon which the lasted shoe has been mounted to turn the star wheel and start the machine, which causes the shoe to be moved rearwardly to bring it into clamping relation with the heel gage 107. Immediately thereafter, through the action of the bell crank arm 119 subsequently brought into operative engagement with the roller 120, the jack operating lever 122 is thrown to the right, Fig. 7, to jack the lasted shoe. Upon starting the machine rotation of the pinion 35 and its cam 36 produces the described horizontal and vertical movements of the jack slide and hence of the jack and, through the rack 100, the described oscillations of the form 2. This movement as has been stated, brings the jack beneath the form, produces the dwell to which reference has been made, and raises the jack vertically to bring the shank of the shoe into direct pressure contact with the shank forming or molding portion of the form, which has been turned to present the same in operative relation thereto. The continued rotation of the rotary cam and its action upon the cam guided rolling roller 40 next produces a relative rolling movement between the sole of the jacked shoe and the form, toward the end of the sole and back again into the approximate initial position of direct pressure. A second dwell in the horizontal movement then takes place during which the jack is lowered.

During the progressive rolling movement of the form and jack, produced by the simultaneous horizontal movement of the shoe and the oscillatory movement of the form, the jack table is caused to rise and fall by and corresponding to the active face of the cam 28 which, as stated, is preferably formed to maintain uniform pressure over the forepart of the sole, substantially equal, it may be, to the direct pressure first produced. Just prior to returning to the initial position of direct pressure, a slight dwell in the horizontal movement of the jack slide is produced by the action of the rotary and stationary cams described, to permit of vertical separation between the jack and form. Immediately thereafter the jack is pushed farther outward by the continuation of its horizontal movement, and projected into what is termed its shoe removing or receiving position. During this outward movement, the action of the cam projection 142 on the bell crank 140 and the slidable pin 139 raises the upturned end 137 of the bell crank 136 to bring it into the path of the depending cam extension 122ᵃ of the jacking lever 122, which engages said upturned end and is swung thereby inwardly in a direction to unjack the shoe. Immediately following this unjacking movement, the pawl carrying arm 125 is brought into engagement with the stationary stop pin 134 causing the pawl 127 at the inner end of said arm to swing to the left, Fig. 8, to produce the relative longitudinal movement between the jack carriage and the jack slide which places them in the positions shown in Figs. 1 and 7, and in which the shoe may be conveniently removed. As the said jack slide moves into its outer position, the cam projection 176 on the inner face of the gear wheel 29 strikes the roller 175 carried by the clutch releasing pin 172 and slides the latter inwardly to cause its pawl 173 to rotate the ratchet wheel 154 and the star wheel 152 connected therewith. This movement raises the roller 151 of the bell crank to its highest position and swings the slidable clutch collar 144 inward to release the clutch and stop the machine. Upon subsequently starting the machine, the rotation of the gear wheel 29 brings its cam projection 176 into engagement with the lever 177 to secure the return of the clutch releasing pin and its pawl 173 to their outer position for subsequent actuation by the cam projection 176.

My invention provides among other features, simple and effective mechanism, first, for automatically positioning and jacking the shoe by the starting of the machine; second, for bringing the lasted shoe into direct pressure contact with a form adapted to mold a predetermined area such as the shank thereof and to permit of a sufficient dwell under said direct pressure; third, for thereafter laying an adjacent portion, here shown as the fore part, of the sole by an oscillatory action; and finally, for returning the shoe and form to their initial position of direct pressure, separating the same vertically, sliding the jack into its outer shoe removing position and simultaneously with said movement unjacking the shoe to permit of its convenient removal from its supporting members.

My invention also provides a machine in which many of the operations hitherto performed by hand are effected automatically, requiring no other labor upon the part of the operative than that of placing a lasted shoe upon the jack and starting the machine, thereby eliminating the preliminary or separate positioning or jacking movements of the jack usually effected by the operative. The invention thus economizes the time and energy of the operative and speeds the machine, and hence reduces the cost of manufacture.

My invention, obviously, is not limited to the particular embodiment herein selected for purposes of description and illustration only, nor to the specific details of construction and arrangement, as the same may be modified within wide limits without departing from the spirit and scope thereof.

I claim—

1. A sole pressing machine, comprising in combination, a shoe support, sole pressing means, and means to operate the same to produce direct pressure upon one part of the shoe sole and progressive pressure upon another part thereof.

2. A sole pressing machine, comprising in combination, a shoe support, sole pressing means, and means to operate the same to produce direct pressure upon one part and a pressure progressing alternately in opposite direction upon another part thereof.

3. A sole pressing machine comprising a form, a shoe support, and means to produce between said form and support direct and rolling contact pressure for and upon separate portions of the shoe sole.

4. A sole pressing machine, comprising a form, a shoe support, and means to produce between said form and support, first a direct pressure and then a rolling contact pressure, upon and over separate portions of the shoe sole.

5. A sole pressing machine, comprising a form having shank and fore part molding faces, a support for a shoe, and means for operating said form and support to bring the shank of a shoe into direct pressure contact with the complemental shank molding face of the form for laying the shank of the shoe sole and to effect relative rolling contact between said form and support to bring the fore part of said sole into pressure contact with the fore part molding face of said form.

6. A sole pressing machine, comprising in combination, a form, a last, and means to effect relative horizontal and vertical movements thereof for bringing them into operative relation one with the other; to cause simultaneous dwell in the horizontal movement and direct pressure contact of said form and last over one portion of the latter, and thereafter to roll said last and form relatively upon and over a separate portion of said last.

7. A sole pressing machine comprising in combination, a form, a jack movable into and out of sole pressing contact with said form, and means to move said jack inward and beneath said form; to cause a dwell during said movement, and simultaneously to raise said jack into and to maintain one portion of the sole of a shoe therein in direct pressure contact with said form for a predetermined time, and thereafter to effect rolling pressure contact between said form and jack, over a different portion of the sole of said shoe.

8. A sole pressing machine, comprising in combination, a jack, a form, and simultaneously effective stationary and movable cams to effect movement of the jack and form toward and from each other.

9. A sole pressing machine comprising, in combination, a jack, a form, stationary and movable cams, and means actuated and controlled thereby for simultaneously operating said jack and said form.

10. A sole pressing machine comprising, in combination, a form, a jack, stationary and movable grooved cams and means comprising an actuating rod and a roller stud means actuated and controlled by said cams for imparting horizontal and vertical movements to said jack for effecting pressure contact between the same and said form.

11. A sole pressing machine, comprising in combination, a form, a jack, means comprising stationary and rotary cams, the latter having switch means, for guiding and moving said jack, and means for controlling and operating said cams respectively.

12. In a machine of the type described, a form, a jack, stationary and rotary cams, means connected therewith for variably moving said jack and said form, and means for controlling and operating said cams respectively.

13. In a sole pressing machine, the combination of a sole pressing form, a movable jack, a stationary cam provided with switch devices, an actuator, and means for moving said actuator in a cam controlled path determined by said switch devices.

14. In a machine of the type described, the combination of a form a jack, a stationary cam, a rotary cam, and means controlled by said cams for intermittently moving said jack with respect to said form.

15. In a machine of the type described, a form, a jack for a shoe, stationary and rotary cams for imparting horizontal movement to the latter and for causing a dwell in said movement, and means for elevating said jack during said dwell to effect direct pressure contact with said form.

16. In a machine of the type described, a form, a jack provided with means for moving it horizontally and for causing a dwell in such movement, and mechanism comprising a cam operated by said means for bringing said jack and form into direct pressure during the dwell in the horizontal movement.

17. In a machine of the type described, a form and a jack relatively movable, an actuator to move the same, and a pair of vertical cams for respectively guiding and imparting movement to said actuator.

18. In a machine of the type described, a form, a jack, an actuator thereof having roller means, and stationary and rotary cams to act upon said roller means respectively to guide and impart movement thereto.

19. A sole pressing machine, comprising in combination, a shoe support, a form, means for relatively rolling one upon the other to lay the sole of a shoe mounted on said support, and cam actuated means for producing a uniform pressure between said form and support during the rolling action thereof.

20. A sole pressing machine, comprising in combination, a shoe support, a form having an irregular molding face, means for relatively rolling one upon the other to lay the sole of a shoe mounted on said support, and cam means capable of producing uniform pressure between them during such movement.

21. A sole pressing machine, comprising in combination, an oscillatory form, a shoe support, means for relatively rolling one upon the other to lay the sole of a shoe mounted on said support and including a cam having a curvilinear face approximately corresponding to that of said form for relatively maintaining the support and said form in operative relation.

22. A sole pressing machine, provided with sole pressing members comprising a form and a shoe support, means comprising a cam and connected actuator for operating the same, said actuator having connection at one end with said cam and at the other with one of said members, and mechanism for causing the cam connected end of said actuator to revolve around the axis of said cam.

In testimony whereof, I have signed my name to this specification, in the presence of two subscribing witnesses.

ERASTUS WOODWARD.

Witnesses:
SIDNEY F. SMITH,
EVERETT S. EWING.